United States Patent [19]
Stafford

[11] 3,744,514
[45] July 10, 1973

[54] AXLE DRIVEN TRAVELING-WHILE-SPRINKLING IRRIGATION APPARATUS

[76] Inventor: Robert R. Stafford, Route 7, Box 1770, Eugene, Oreg. 97401

[22] Filed: Feb. 8, 1972

[21] Appl. No.: 224,510

Related U.S. Application Data

[63] Continuation of Ser. No. 87,302, Nov. 5, 1970, abandoned, which is a continuation of Ser. No. 749,087, July 31, 1968, abandoned.

[52] U.S. Cl. .............................. 137/344, 239/212
[51] Int. Cl. ...................... B05b 9/02, E01h 3/02
[58] Field of Search .................... 137/344; 239/212, 239/213

[56] References Cited
UNITED STATES PATENTS

| | | | |
|---|---|---|---|
| 3,417,766 | 12/1968 | Purtell | 137/344 |
| 3,545,478 | 12/1970 | Etgen | 137/344 |
| 3,444,941 | 5/1969 | Purtell | 137/344 |
| 3,245,595 | 4/1966 | Purtell | 137/344 |
| 3,255,968 | 6/1966 | Stafford | 137/344 X |
| 3,355,109 | 11/1967 | Kane | 137/344 X |
| 3,465,766 | 9/1969 | Siebert | 137/344 X |
| 3,478,773 | 11/1969 | Husky | 137/344 |
| 3,498,542 | 3/1970 | Hefner et al. | 239/212 |
| 3,500,856 | 3/1970 | Boone et al. | 137/344 |

Primary Examiner—Samuel Scott
Attorney—John R. Hall, Joseph B. Sparkman et al.

[57] ABSTRACT

A travelling-while-sprinkling irrigation apparatus having a lateral line which is supported by spaced wheel pairs, the latter being driven by a drive axle extending along the line and drivingly connected to the wheels by mechanisms which permit the wheels of a pair to move, at least to a limited extent, at different speeds as demanded by terrain irregularities. The apparatus has a head rig by which water is supplied to the line. A single water motor on the apparatus drives both the drive axle and the head rig, and means are provided for regulating the speed of the lateral line and the head rig so that the two will move at the same overall rate across a plot of ground.

8 Claims, 11 Drawing Figures

PATENTED JUL 10 1973 3,744,514
SHEET 1 OF 3
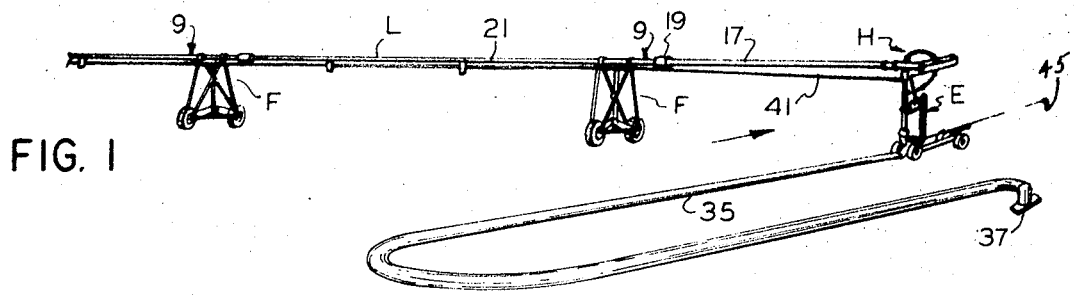
FIG. 1
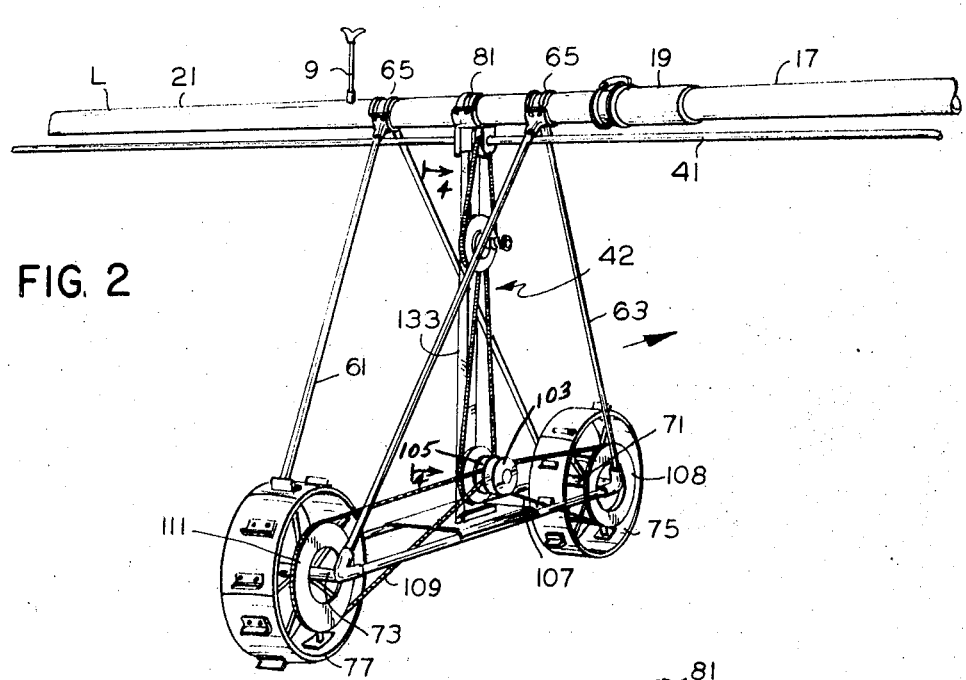
FIG. 2
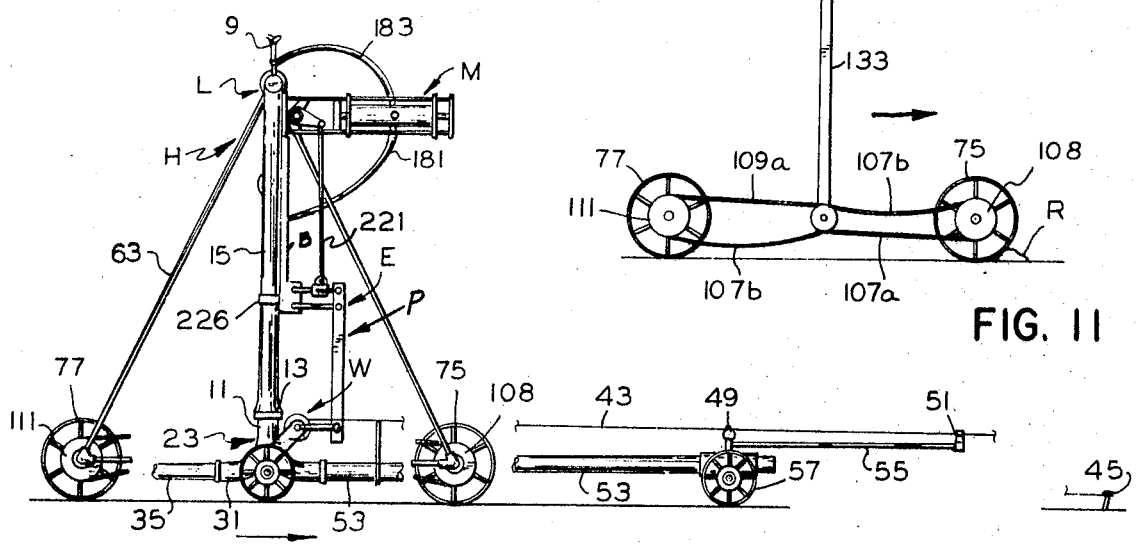
FIG. 3
FIG. 11
ROBERT R. STAFFORD
*INVENTOR*
BY
BUCKHORN, BLORE, KLARQUIST & SPARKMAN
*ATTORNEYS*

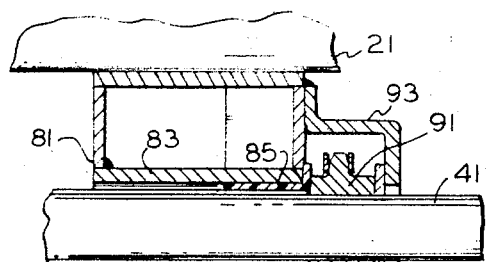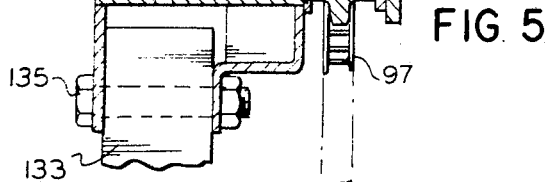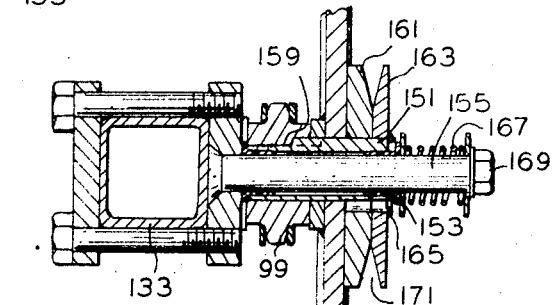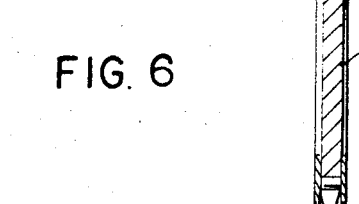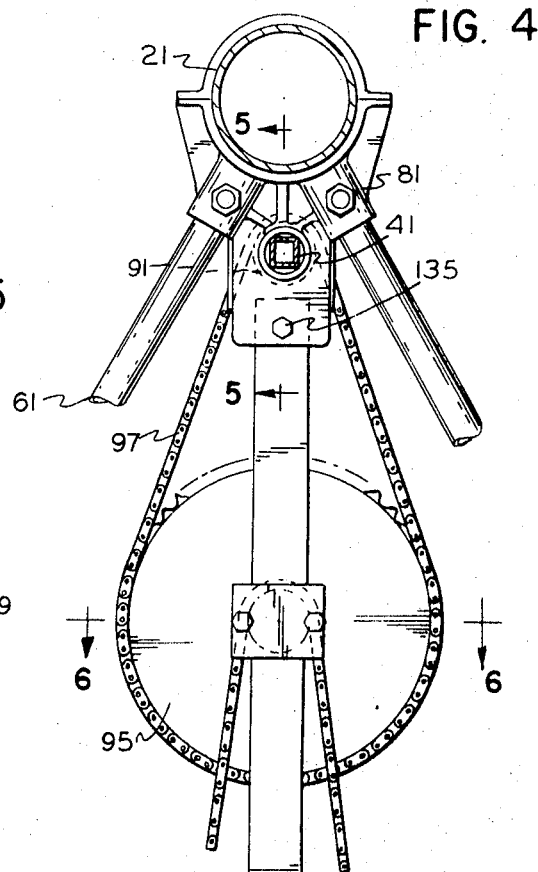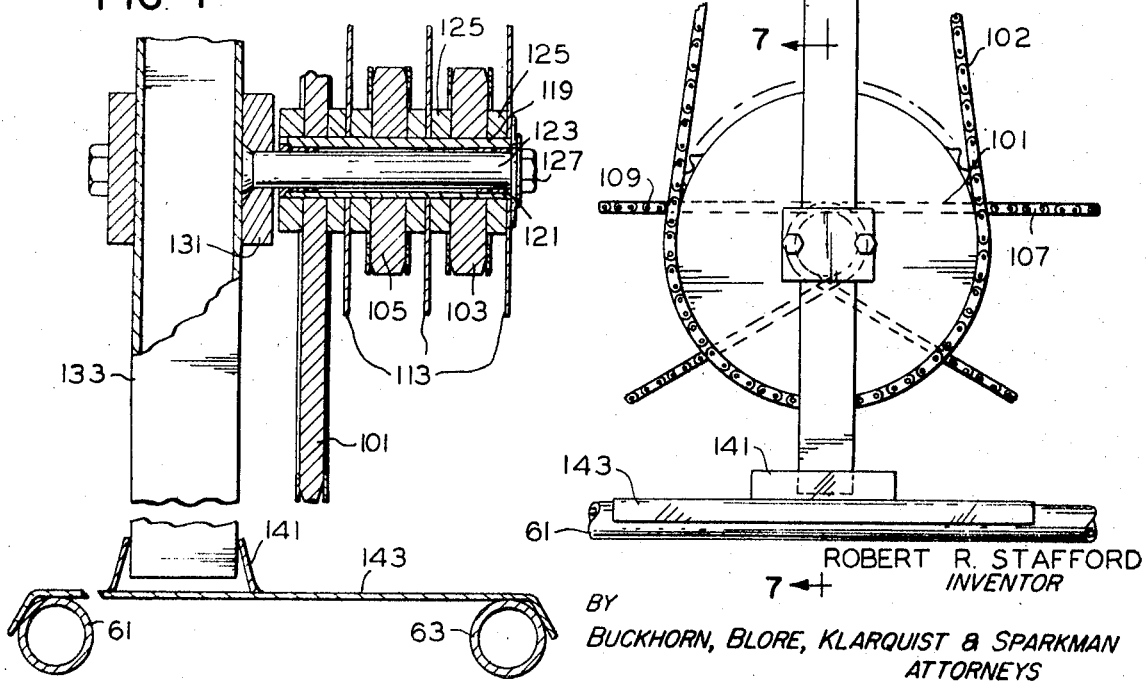

ROBERT R. STAFFORD
INVENTOR

BY
BUCKHORN, BLORE, KLARQUIST & SPARKMAN
ATTORNEYS

AXLE DRIVEN TRAVELING-WHILE-SPRINKLING IRRIGATION APPARATUS

This is a continuation of application Ser. No. 87,302, filed Nov. 5, 1970, which is a continuation of Ser. No. 749,087, filed July 31, 1968, both now abandoned.

BODY OF APPLICATION

My U.S. Pat. No. Re. 26,285 describes a travelling-while-sprinkling irrigation apparatus wherein there is a lateral line having a head rig at one end (although the head rig could be in the middle of the lateral line or at another point, if desired). The lateral line and the head rig are driven by means of the pressure of the water which is used to irrigate the land. Means are provided to regulate the relative speed of the lateral line and the head rig so that their overall effective rate of travel is the same. In the specific embodiment of my invention shown in U.S. Pat. No. Re. 26,285, the drive to the lateral line is in the form of water motors for the wheels which support the line. The drive to the head rig is by means of a telescopic pipe arrangement extendable under pressure, or by a water motor for the head rig.

It is known to provide wheeled irrigation systems wherein the lateral line is driven by a drive axle running the length of the lateral line. However, I know of no travelling-while-sprinkling irrigation apparatus of the drive axle type.

It is a principal object of the present invention to provide such an apparatus.

Another object of the invention is to provide such an apparatus wherein there are speed regulating means to control the relative overall effective speed of the lateral line and the head rig.

A further object of the invention is to provide an irrigation apparatus of the drive axle lateral line type which is supported by wheel pairs, wherein the drive to a wheel pair permits the wheels, at least to a limited extent, to be driven at different speeds as determined by terrain irregularities.

BRIEF DESCRIPTION OF THE DRAWINGS

FIG. 1 is a somewhat diagrammatic, fragmentary perspective view of an irrigation apparatus embodying the concepts of my invention;

FIG. 2 is an enlarged view of one of the A-frames supporting the lateral line of my apparatus;

FIG. 3 is an end view of my irrigation apparatus, particularly showing the head rig;

FIG. 4 is an enlarged, broken elevational view better showing the drive to the wheels;

FIG. 5 is a vertical sectional view taken along line 5—5 of FIG. 4 on an enlarged scale;

FIG. 6 is a horizontal sectional view taken along line 6—6 of FIG. 4 on an enlarged scale;

FIG. 7 is a vertical sectional view taken along line 7—7 of FIG. 4 on an enlarged scale;

FIG. 11 is a diagrammatic view of part of the drive mechanism to the wheels of an A-frame.

GENERAL DESCRIPTION

Figure 9:
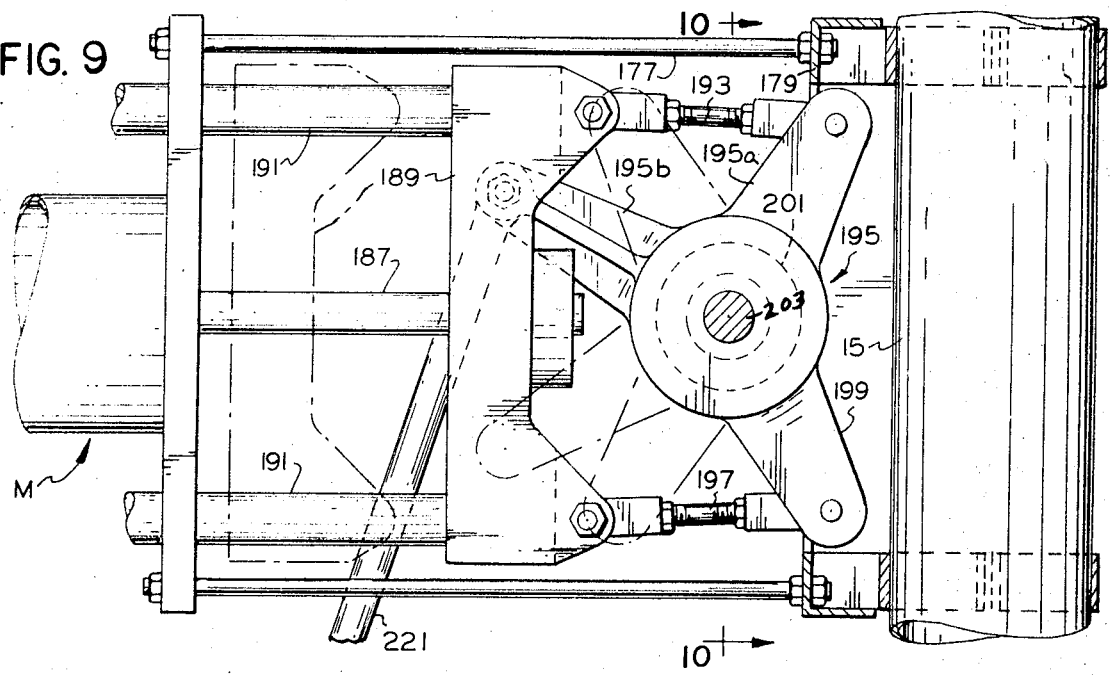
FIG. 9 is an enlarged fragmentary elevational view of an end of the water motor drive for the apparatus, on a scale larger than that of FIG. 8.

The irrigation apparatus of my invention includes a lateral line L (FIG. 1) supported by plural, wheeled A-frames F, and having sprinklers 9 distributed therealong to sprinkle water on the plot of ground across which the apparatus travels. At one end of the line L is a head rig H, which includes a lower pipe section 11 (FIGS. 3 and 8) swivelly connected at 13 to an upper pipe section 15. Pipe section 15 is rigidly secured at its upper end to one end of a pipe section 17 (FIG. 8) of the line L. Pipe section 17 has its other end coupled by a standard irrigation coupling 19 (FIG. 1) to the next pipe section 21 of the lateral line.

The lower pipe section 11 is shown as being part of a wheel supported T fitting 23 (FIG. 3) having a rearwardly directed inlet 31 (FIG. 3) which is connected to one end of a water supply hose 35 (FIGS. 3 and 1). The other end of the hose is connected to a water supply outlet 37 (FIG. 1) in the ground. It is assumed that the irrigation apparatus is travelling over a plot of ground in parallel relation to a series of spaced water outlets, so that the irrigation apparatus can travel the distance of one outlet to the next while irrigating, then be connected to such next outlet, and then recommence travelling-while-sprinkling, until it needs to be connected to a third outlet, whereupon it is connected to the same and the procedure is repeated.

A water motor M (FIGS. 3 and 8) on the head rig H drives both the lateral line L and the head rig H. The drive to the lateral line is by means of a drive axle 41 (FIGS. 2 and 8) extending along the line and drivingly connected to the wheels by chain and sprocket mechanisms 42 to be described.

The drive to the head rig is by means of a winch W on the T-fitting 23, the winch being driven by a reciprocating mechanism E (FIGS. 3 and 8) from the water motor M. The winch reels in a cable (or line) 43, the free end of which is secured to an anchor at 45 (FIG. 3) in the ground at a place along the expected line of travel of the head rig, and in advance of the head rig. The winch size is such that it causes the head rig to travel at a faster rate than that of the lateral line. However, the reciprocating mechanism E includes a means which interrupts the drive to the winch in a manner so that the overall effective rate of movement of the lateral line and the winch are the same.

The line 43 passes through guides 49 and 51 (FIG. 3). Guide 49 is mounted on the front end of a fixed tongue 53 which is secured to the wheeled T-fitting 23. Guide 51 is secured to the front end of a swinging tongue 55 which is fixed to a wheeled carriage 57 which pivotally supports the front end of the fixed tongue 53.

DETAILED DESCRIPTION

The wheeled A-frames F are of identical construction, so only one will be described. The A-frame in FIG. 2 includes a pair of triangular brace structures 61 and 63 (FIG. 2) which have clamps 65 at their upper ends secured to the pipeline of the lateral line L. It is assumed that FIG. 2 shows the right hand A-frame of FIG. 1. Thus the clamps 65 clamp onto pipe section 21.

At each set of lower corners, the brace structures 61 and 63 have a wheel axle, the axles being numbered 71 and 73 in FIG. 2. A wheel 75 is provided for axle 71 and a wheel 77 for axle 73.

DRIVE TO WHEELS

The chain and sprocket mechanism 42 of FIGS. 2 and 4–7, include a clamp 81 (FIGS. 2 and 5) secured to pipe section 21. The clamp has a tubular journal 83 (FIG. 5) through which drive axle 41 extends, and in which the axle is journaled by a bushing 85.

There is a drive sprocket 91 (FIG. 5) mounted on the axle 41 and retained in place by an angular lug 93 on the clamp 81. Sprocket 91 drives a larger jack-shaft sprocket 95 (FIGS. 4 and 6) by means of a chain 97. Sprocket 95 is releasably keyed to a small sprocket 99 which drives a lower, larger sprocket 101 by a chain 102 (FIGS. 4 and 7). Sprocket 101 is keyed to two small wheel drive sprockets 103 and 105. Sprocket 103 drives wheel 75 by means of a chain 107 (FIG. 2) and a sprocket 108 (FIG. 2) secured to the spokes of the wheel, and sprocket 105 drives wheel 77 by means of a chain 109 and a sprocket 111 secured to the spokes of such wheel. A chain feeder and guide 113, shown fragmentarily in FIG. 7, may be provided.

Sprockets 101, 103 and 105 fit on a square sleeve shaft 119 (FIG. 7) which is rotatably mounted by bushings 121 on a stub axle 123. Spacers 125 are provided for the sprockets, and a bolt and washer 127 retain the sprockets in place. The stub axle 123 is carried by a clamp 131 which is secured to the lower end portion of a sprocket mounting post 133.

The upper end of post 133 is pivotally connected (for a purpose to be presently described) by a bolt 135 (FIG. 5) to a hanger 137 formed on the clamp 81. The lower end of the post is slidably disposed between the flanges 141 (FIG. 7) of a guide plate 143. The latter is secured to the lower portions of the brace structures 61 and 63.

Sprocket 95 (above-mentioned) is mounted on a square sleeve shaft 151 which is rotatably mounted by bushings 153 on a stub axle 155. The axle is carried by a clamp 157 which is mounted on the post 133.

The square sleeve shaft 151 has a portion 159 of reduced circular cross section which rotatably fits in a hole in small sprocket 99. However, the inner square end of the square shaft 151 non-rotatably projects into the sprocket to normally prevent rotation of the sprocket 99 relative to the sprocket 95.

A pair of discs 161 and 163 fit on the square sleeve shaft 151 next to the sprocket 95 and are retained in place by a snap ring 165. The discs are normally retained in contacting relationship by a compression spring 167 which is held in place by a bolt and washer 169.

It is evident that if the discs are separated (such as by prying them apart at the recess 171 provided by the discs) the square sleeve shaft 151 will be pulled outwardly to separate the inner square portions thereof from the sprocket 99. This permits relative rotation of the two sprockets. This relative rotation would be required to temporarily interrupt the driving connections of the wheels 75 and 77 to the drive axle 41 should an A-frame, for any reason, get out of line with the rest, and need to be pushed back into alignment.

As before stated, the sprocket mounting post 133 is pivotally mounted by a bolt 135 on the clamp 81, thus effectively pivotally mounting such post on the associated A-frame. Should the wheels 75 and 77 be travelling over terrain of the same contour, the post will remain substantially stationary, being so held by the chains 107 and 109, which drive the wheels 75 and 77. Under these conditions, the bottom reach 107a (FIG. 11) of chain 107 and the top reach 109a of chain 109 will be under tension.

Suppose now that wheel 75 encounters a rock R (FIG. 11) or small ridge in the ground over which it must ride, while the wheel 77 is on flat terrain. This means that wheel 77 will be attempting to shove wheel 75 over the rock. This places substantial strain on the upper reach 109a of the chain 109. Under these circumstances, wheel 77 must have rotational slippage relative to the ground, or wheel 75 must slide relative to the rock or other obstruction, or there must be partial rotational slippage and partial sliding movement. Which action occurs will depend upon the conditions of the particular spots engaged by the wheels at any one time. The same situation will exist when the rear wheel reaches such rock or ridge because wheel 75 will be trying to pull wheel 77 along, at a faster rate than it wants to travel, because it has to move up and over the periphery of the rock R. Thus wheel 75 must rotationally slip or wheel 77 must slide forwardly or there must be a combination of these actions. In any event, it is evident that because of the unreliability on what action is going to take place, the above condition will soon cause misalignment of the A-frames relative to one another. In addition, the strain on the chains 107 and 109 may cause them to break; but in any event results in their earlier failure than otherwise would be the case.

I overcome the above problems to a substantial extent my mounting the post 133 on the pivot 135 so that the lower end thereof can move back and forth as demanded by the relative tension in the chains 107 and 109. What happens, is that as wheel 75 rides up and over the rock R, the tension in upper reach 109a of chain 109 increases while the tension in chain 107a decreases. The chain 109a thus pulls the post 133 rearwardly somewhat. This slows down the speed of wheel 77 slightly, while such movement of the post urges wheel 75, through chain reach 107a to move slightly faster. This means that momentarily the A-frame associated with the wheels of FIG. 11 will fall slightly behind the other A-frames, and will remain slightly behind until the rear wheel 77 subsequently reaches the rock R. At this time the increased tension in the lower reach 107a of the chain 107 together with the decreased tension in the upper reach 109a of the chain 109 causes the post 133 to move forwardly from its rearwardly inclined position. This will function to speed up wheel 77 sufficiently so that the A-frame is brought back into alignment with the other A-frames. Since the other A-frames are similarly constructed, should they encounter irregular conditions of a nature which might tend to throw them out of alignment, they will react similarly to the above described A-frame so that their alignment with the other A-frames is substantially maintained.

The above described movement can also be considered from the view point that the wheel 75 has a circumferential distance to move that is greater than the wheel 77 for the same period of time while passing over the rock R. Since sprocket 108 is rigidly connected to wheel 75, and since wheel 75 must turn farther than wheel 77, this allows chain 107 to become somewhat longer, getting some of the slack out of chain 107b, hence allowing the swinging arm 133 to swing slightly back toward wheel 77. Thus, each wheel is pulling against the other which puts equal torque on each wheel at all times, which allows each wheel to travel over normal terrain without forcing one or the other to slip or slide, which would create a permanent misalignment between the associated two frames with respect to the other two frames. When wheel 77 encounters the rock R, the process is reversed, and the swinging arm 133 returns to its neutral position.

HEAD RIG AND WATER MOTOR

FIGS. 3 and 8-11 best show the head rig H. The water motor M is shown mounted by rods 177 to a clamp 179, the latter being clamped about the upper pipe section 15 of the head rig. The water motor may be of conventional form, having a built in valve means so that water supplied to the motor by a hose 181 (FIG. 3) will cause reciprocating motion of the piston means of such motor. The discharge water from the motor may be exhausted on the ground at the head rig, or conveyed by an outlet hose 183 to the first sprinkler 9 of the apparatus. (In such case, the first sprinkler would not receive water from the lateral line).

The piston means of the motor M has a piston rod 187 (FIG. 9) driving a crosshead 189, the latter being supported by guides 191 slidably supported by the casing of the motor M. In the event the motor M is of the type having two pistons, a second crosshead, not shown, at the other end of the motor, would be connected to the piston rod of the other piston and to the guides 191, so that one piston would drive in one direction and the other piston in the opposite direction.

Figure 10:
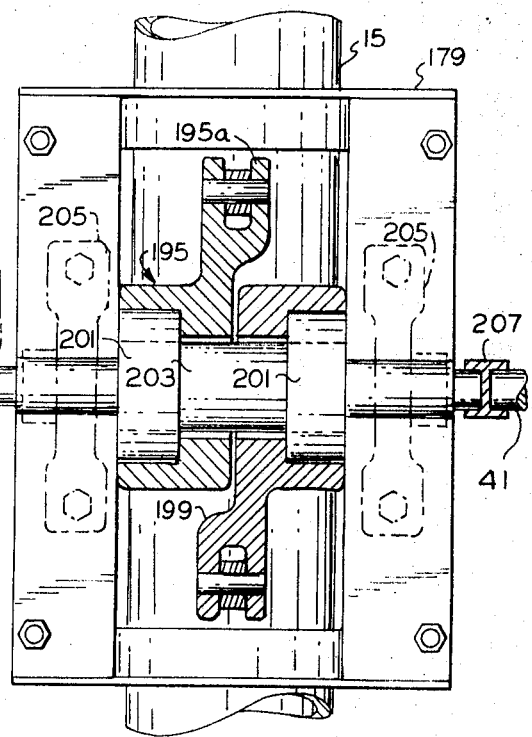
FIG. 10 is a fragmentary sectional view taken along lines 10—10 of FIG. 9.

A connecting rod 193 (FIG. 9) connects the crosshead 189 to one arm 195a of crank 195, and a connecting rod 197 connects the crosshead to the arm of a crank 199 (FIGS. 9 and 10). Both cranks are mounted by conventional one-way drive clutches 201 (FIG. 10) to a double ended drive shaft 203. The shaft is mounted by bearings 205 on the clamp 179 (FIG. 10) and is connected to the drive axle 41 by a coupling 207. The drive shaft 203 is driven continuously in one direction by the alternate driving operation of the cranks 195 and 199.

DRIVE TO THE WINCH

Figure 8:
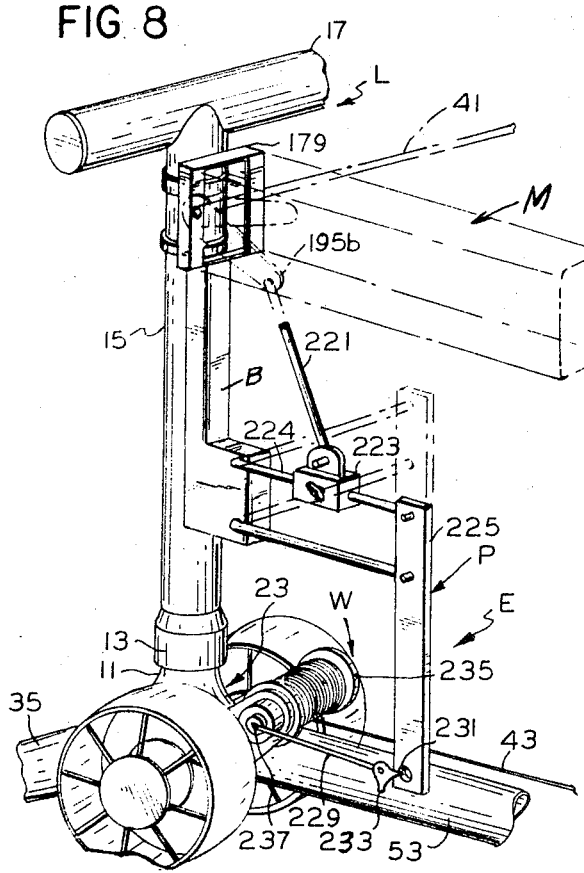
FIG. 8 is a somewhat diagrammatic perspective view of the head rig of the apparatus.

The crank 195 (FIG. 9) has a second arm 195b (FIGS. 9 and 8) which is connected by a link 221 to a block 223, the latter being adjustably mounted on the upper horizontal link 224 of a parallel linkage P. The mechanism E includes a mounting bracket B (FIGS. 3 and 8) which depends from the clamp 179 (FIG. 8). There is a clamp 226 (FIG. 3) releasably securing the bracket B to the vertical pipe section 15. The outer vertical link 225 of the linkage extends downwardly to a position adjacent a drive arm 229 of the winch W. The lower end of the link 225 has a hole 231 (FIG. 8), and the arm has a double pronged head 233 which normally has one of the prongs disposed in the hole 231 to cause reciprocation of the arm.

The arm 229 drives the winch drum 235 via a double ratchet unit 237 of conventional form. One pawl of the unit 237 holds the drum in place during conditioning movement of the other pawl, and then releases the drum when such other pawl is moved to drive the winch in the direction desired, i.e., in the present case in a direction to reel in the line 43.

OPERATION

In operation, reciprocation of the water motor M drives the axle 41 (FIG. 8) to drive the lateral line L over the ground to be irrigated. The motor M through the mechanism E drives the winch W to reel in the line 43 to advance the head rig in the same direction as the lateral line L is moving. The drive to the winch will cause the head rig to travel at a rate slightly in excess of that of the lateral line.

Shortly, the head rig will be driven ahead of the lateral line L (which movement is permitted by the inherent flexibility of coupling 19 (FIG. 1) in the lateral line. Since the parallel linkage P is carried by the upper pipe section 15, while the arm 229 is carried by the lower section 11, trailing movement by the lateral line L will cause the link 225 to swing slightly away from the head 233 on arm 229 (by an amount approximately the same as the angle formed between pipe section 17 and section 21 because of the advance of the head rig). This separation of the link 225 and the head 233 interrupts the drive to the winch. This brings the head rig to a halt, until the lateral line L catches up (at least somewhat) with the head rig. This catching up decreases the angle between pipe sections 17 and 21 and brings link 225 back so that hole 231 again is engaged by the head 233. The head rig is again driven forwardly until the drive is interrupted again, and so on. This means that the overall rate of travel of the lateral line L and the head rig will be the same, although the instantaneous rates of travel of the two will seldom be the same.

It will be understood that the particular control of FIG. 8 is illustrative, and the angularity between the head rig H and the line L may be used to operate other control systems and mechanisms, either hydraulic, mechanical, electronic, electrical, photocell, etc.

When the irrigation apparatus reaches the end of the field, it may be operated in the reverse direction quite simply. The drive shaft 203 (FIG. 10) is disconnected from the axle 41, the clamps 179 and 226 for the water motor M and for the parallel linkage are loosened, and the motor and linkage swung 180° to point in the opposite direction. The drive shaft 203 then has its other end connected to the axle 41.

The hose 35 and line 43 are disconnected, whereafter the lower portion of the head rig, including the T-fitting 23, the winch W, tongues 53 and 55, etc., are swung around 180° to point in the opposite direction, whereby to position the other prong of the head 233 of the winch drive arm 229 in driving engagement with the hole 231 in link 225. The holding pawl on the winch W is released and line 43 pulled out and secured to a repositioned anchor 45. The hose 35 is connected up and the appratus is ready to go.

Only those parts necessary for an understanding of the invention have been disclosed and described. Other structure will usually be provided but is not shown since it would tend to confuse rather than clarify the invention. For instance, various guy wires may be provided on the lateral line for reinforcing the same.

Having described the invention in what is considered to be the preferred embodiment thereof, it is desired that it be understood that the invention is not to be limited other than by the provisions of the following claims.

I claim:
1. An irrigation apparatus comprising:
 a lateral line of linear form,
 a plurality of frames distributed along the line and supporting the same, a pair of wheels for each frame, an axle extending along said line and adapted to be rotated, a mechanism at each frame drivingly connecting said axle to the wheels of said frame, a head rig for said line, a hose adapted for connection to a ground outlet for supplying water to said line, means for connecting said hose to said line and maintaining said connection while said line and head rig are travelling, so that sprinkling occurs during the travel of said head rig and line, and drive means for driving said head rig in the same direction as said line and at the same overall rate, said drive means comprising a motor having an interruptable drive to one of said axle and head rig, and a constant drive to the other, said head rig including the section of said line next said head rig and another pipe section rigid with the just-mentioned section and extending angularly therefrom, said just-mentioned section being coupled to the remainder of said line by a means permitting angularity to develop between said just-mentioned pipe section and the section of said line to which it is coupled, said head rig including a lower wheeled pipe section swivelly coupled to said another pipe section whereby when the head rig and line change position relative to one another said another pipe section and said lower pipe section have relative swivelling movement, said interruptable drive being responsive to predetermining of such swivelling movement.

2. An apparatus as set forth in claim 1, in which said lower pipe section is connected to said hose whereby said hose is pulled along by advancing movement of said head rig.

3. An irrigation apparatus comprising:

a lateral line of linear form, a plurality of frames distributed along the line and supporting the same, a pair of wheels for each frame, an axle extending along said line and adapted to be rotated, a mechanism at each frame drivingly connecting said axle to the wheels of said frame, each mechanism including means whereby the drive from said axle is imparted in such a manner as to permit one wheel a greater circumferential movement than the other, but still maintaining equal torque on each wheel when demanded by terrain irregularities, each mechanism including a vertical post swingably mounted at its upper end for swinging movement back and forth between said wheels, a pair of sprocket means keyed together and rotatable on the lower end of said post in driven relation to said axle, and a pair of chain-and-sprocket means each including a chain extending from the lower end of said post to one of said wheels whereby the circumferential movement of the wheels determines the position of said post.

4. An irrigation apparatus as set forth in claim 3, wherein:

said chains are driven by said axle at the same speed, guide means for the lower end of said post guide the same for back and forth adjusting movement as determined by such relative tension, and means whereby the drive from said axle to said wheels on any selected frame may be interrupted independently of the others.

5. Irrigation apparatus including a water carrying line, means for driving and supporting said line, including front wheel means and rear wheel means, drive axle means extending along said line and supported for rotation, and drive transmitting means operatively connecting said drive axle means and both said front wheel means and said rear wheel means, the drive transmitting means including toothed, non-slip front drive train means coupling the drive axle means to the front wheel means and toothed, non-slip rear drive train means coupling the drive axle means to the rear wheel means, the drive train means including floating coupling means permitting only a predetermined amount of differential movement between the front drive means and the rear drive means.

6. In an irrigation apparatus, a water carrying line, a frame supporting a portion of the line and adapted to move the line laterally in a forward direction, a front wheel carrying the frame and positioned forwardly of the line, a rear wheel carrying the frame and positioned rearwardly of the line, a drive shaft on the frame, non-slip, toothed drive train means coupling said shaft to the front and rear wheels, said drive train means including differential means permitting differential movement of the wheels without interrupting the driving connection but instead apportioning of the drive movement between the wheels in accordance with the amount of circumferential movement of the wheels relative to one another.

7. The irrigation apparatus of claim 6 wherein the front drive train means includes a front sprocket keyed to the front wheel and a front chain on the front sprocket, the rear drive train means including a rear sprocket keyed to the rear wheel and a rear chain on the rear sprocket, the differential means including floating carriage means, means mounting the carriage means for movement on the frame forwardly and rearwardly and stop means limiting forward and rearward movement of the carriage means, a front drive sprocket on the carriage means and meshing with the front chain, a rear drive sprocket on the carriage means meshing with the rear chain and fixed to the front drive sprocket for rotation therewith, the drive shaft being coupled to and serving to drive the front and rear drive sprockets.

8. The irrigation apparatus of claim 7 wherein the floating carriage means comprises a generally vertical arm pivotal on the frame at the upper end of the arm and carrying the front and rear drive sprockets rotatably on the lower end of the arm.

* * * * *